Figure 1:
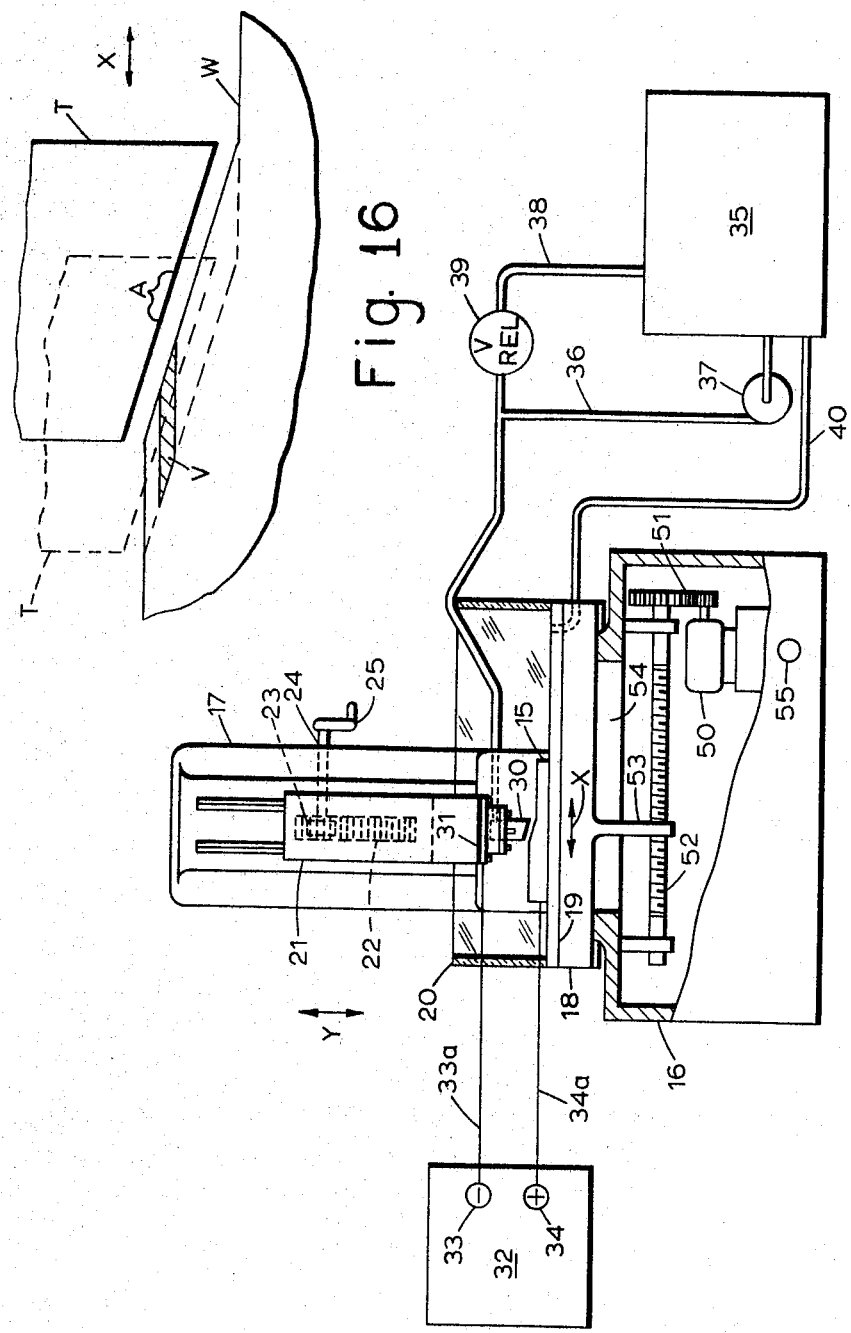

June 6, 1967 W. A. HAGGERTY 3,324,021
ELECTROCHEMICAL MACHINING APPARATUS AND TOOL THEREFOR
Filed Oct. 23, 1962 5 Sheets-Sheet 2

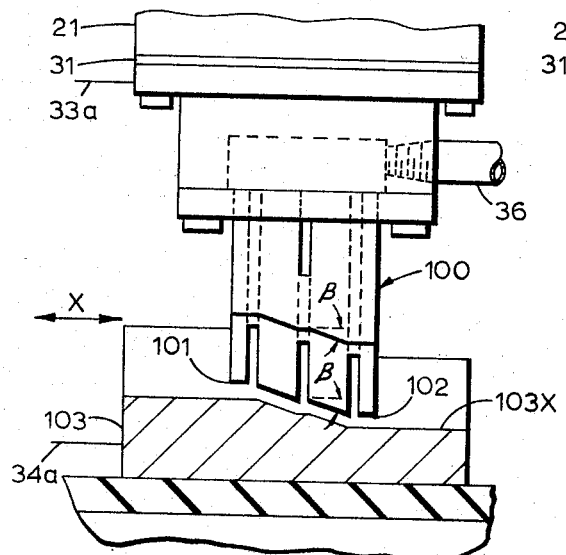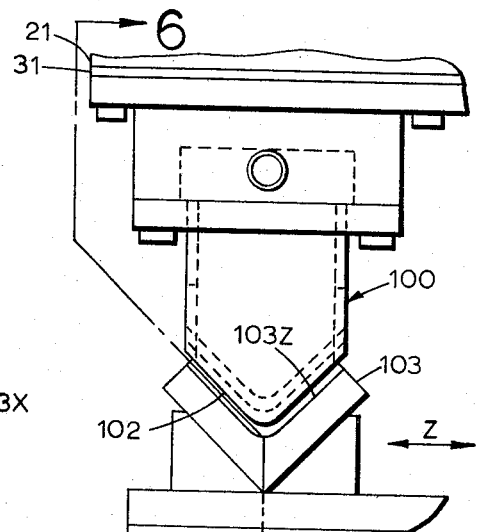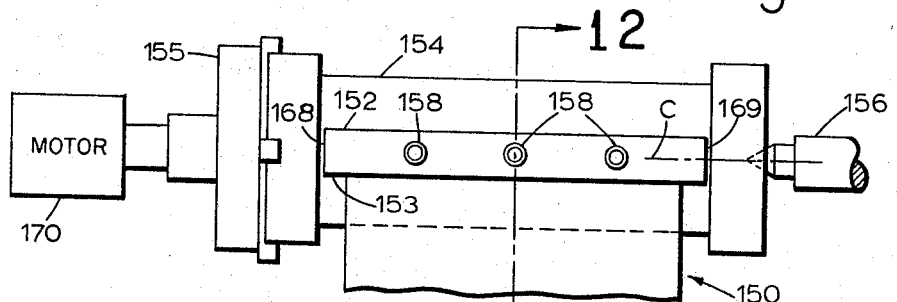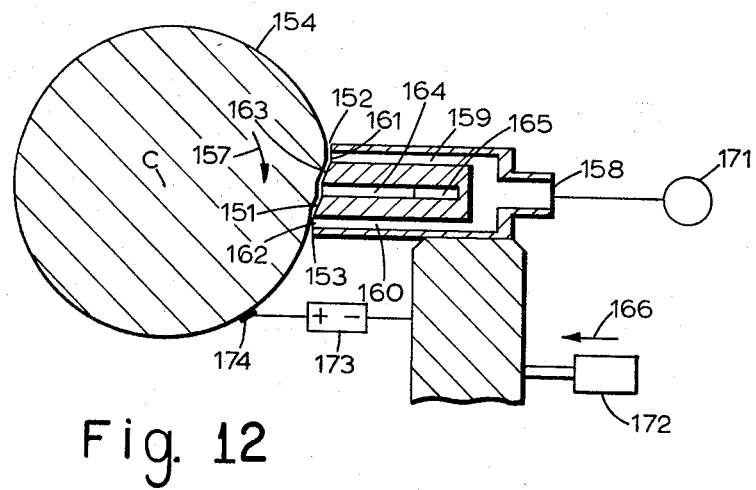

June 6, 1967   W. A. HAGGERTY   3,324,021
ELECTROCHEMICAL MACHINING APPARATUS AND TOOL THEREFOR
Filed Oct. 23, 1962   5 Sheets-Sheet 5

United States Patent Office 3,324,021
Patented June 6, 1967

3,324,021
ELECTROCHEMICAL MACHINING APPARATUS AND TOOL THEREFOR
William A. Haggerty, Montgomery, Ohio, assignor to The Cincinnati Milling Machine Co., Cincinnati, Ohio, a corporation of Ohio
Filed Oct. 23, 1962, Ser. No. 232,461
6 Claims. (Cl. 204—224)

The present invention relates to electrochemical machining, and to an electrochemical machining tool designed to effect a high rate of metal removal from a workpiece, which tool is particularly suitable as a surface finishing tool.

In electrochemical machining, a source of electrical energy is connected across the tool and the workpiece to pass a direct current through a conducting electrolyte fluid introduced into the operating zone between the workpiece and the tool. The electrolyte fluid is in electrical contact with both the workpiece, which must be of an electrical conducting material, and an electrical conducting machining surface of the tool. The machining surface of the tool is generally moved or held in closely spaced relation to the workpiece to confine the machining operation to a selected workpiece surface, or a selected portion of a workpiece surface, and to provide a short current path through the electrolyte minimizing power requirements of the operation. Generally, the electrolyte fluid, which contains ions that combine with the metal ions removed from the workpiece, is circulated to prevent saturation and consequent diminishing effectiveness of the electrolyte, and to remove heat from the operating zone.

In an electrochemical operation, the amount of metal removed from the workpiece in any given time is proportional to the current passing through the operating zone. The amount of current passed through the operating zone will depend on the current density and the area of the operating zone. For any given current density, the amount of current which can be passed through the operating zone, and hence the amount of metal which can be removed from a workpiece in a given time, will depend on the area of the operating zone, and, more specifically, the area of the machining surface of the tool in electrical contact, through the electrical conducting fluid electrolyte, with a portion of the workpiece to be machined.

It is a general object of the present invention to provide an improved electrochemical machine tool organization and tooling which provides an operating zone of large area for rapid metal removal from a workpiece.

It is a more specific object of the present invention to provide an improved electrochemical tool presenting to a workpiece a machining surface which is large relative to the depth of material to be removed, even when shallow cuts are required. In the present invention a tool is provided having a machining surface with a leading edge and a trailing edge. The machining surface is inclined at a small angle from the direction of relative feeding movement between the workpiece and the tool with the trailing edge of the tool providing the deepest penetration of the work. With the machining surface inclined obliquely to the direction of relative feeding movement between the tool and the workpiece, the leading edge of the machining surface moves in closely spaced relation to the unmachined surface of the workpiece and removes little or no metal therefrom, while the trailing edge of the machining surface effects the deepest penetration of the workpiece. Thus the entire span of the machining surface of the tool between the leading edge and the trailing edge simultaneously operates on the workpiece to remove metal, and this span of the tool is considerably greater than the depth of the layer of material to be removed from the workpiece. Therefore, even though only a thin layer of material is to be removed from the workpiece, the rate of metal removal is high, and a high feed rate between the tool and the workpiece is possible. The profile of the machining surface of the tool transverse to the feed direction is of the shape required for the profile of the workpiece transverse to the feed direction.

For the machining area of an electrochemical tool to be effective, it is necessary for electrolyte to be continuously present between the machining area and the workpiece. For the machine tool of the present invention to effectively enter and leave the workpiece, it is particularly important that electrolyte be continuously supplied to the leading and trailing edges of the machining area, as well as to the oblique span therebetween. It is therefore another object of the present invention to provide an improved electrochemical tool having an oblique machining span presented to the workpiece in which a continuous supply of electrolyte is circulated from the leading and trailing edges thereof through the operating zone. This is accomplished by providing openings along the leading and trailing edges of the machining surface for the introduction of electrolyte fluid to the operating zone, and providing an intermediate opening in the machining surface for the removal of fluid from the operating zone.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2:
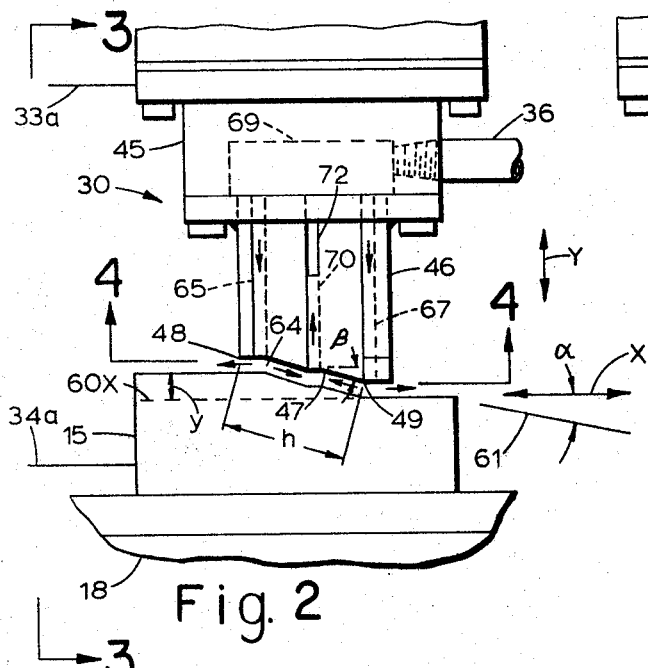
Figure 3:
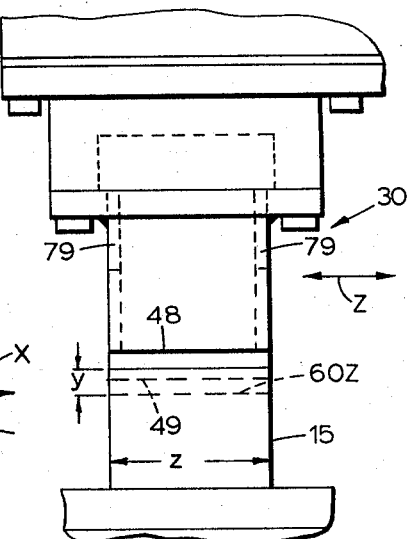
Figure 4:
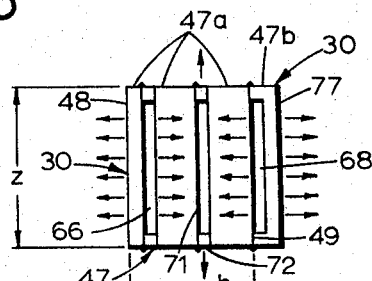
Figure 7:
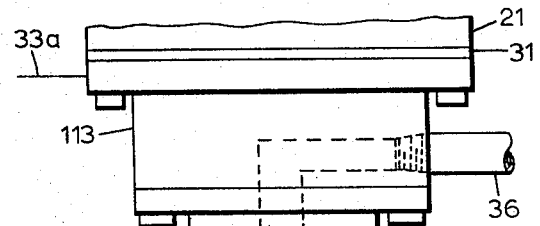
Figure 8A:
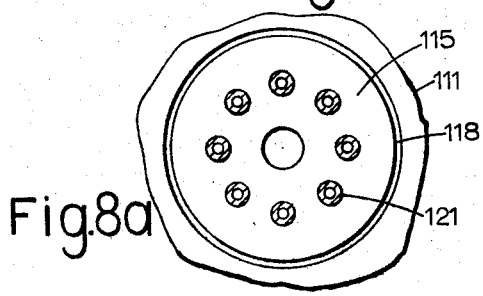
Figure 8B:
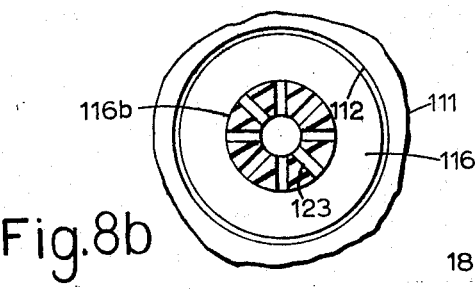
Figure 9:
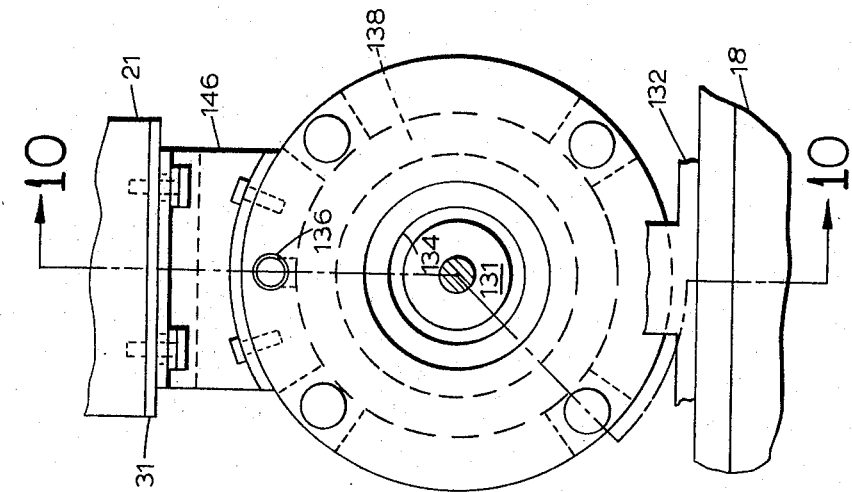
Figure 10:
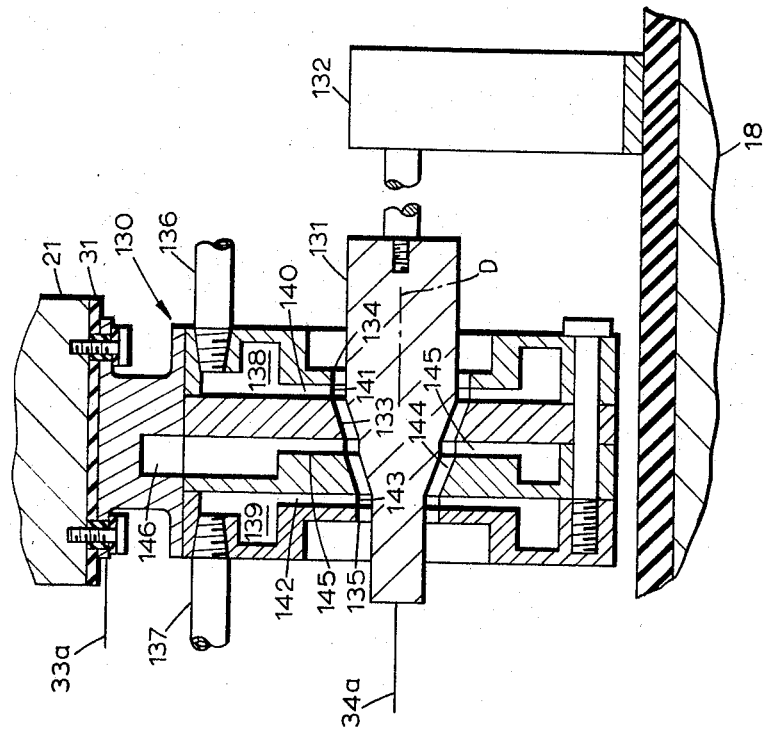
Figure 13:
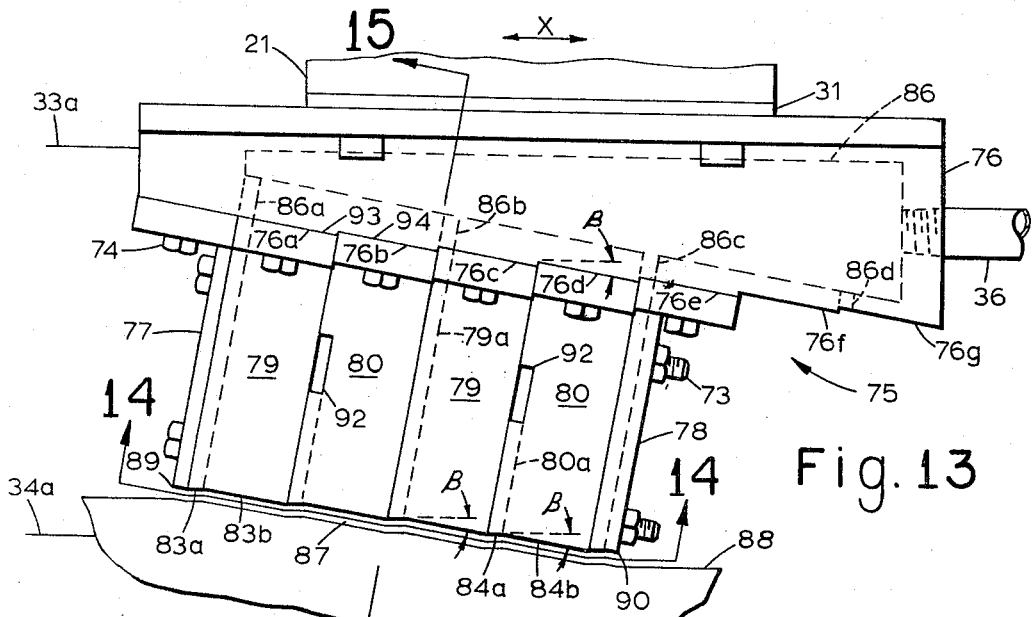
Figure 14:
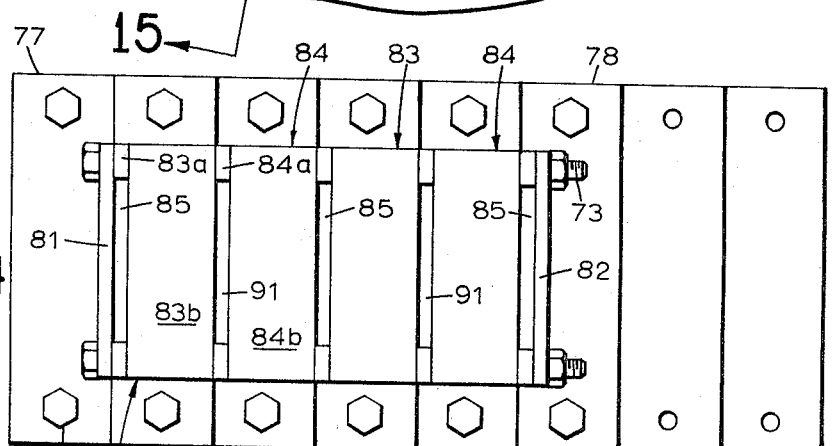
Figure 15:
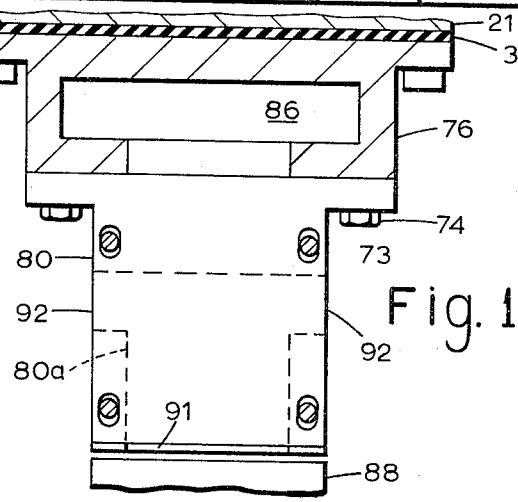

In the drawings:
FIG. 1 is a view in elevation of a machine tool organization for electrochemical machining;
FIG. 2 is a view in elevation of an electrochemical machining tool operating on a workpiece;
FIGS. 3 and 4 are views taken on the lines 3—3 and 4—4, respectively, of FIG. 2;
FIG. 5 is a view in elevation of an electrochemical machining tool of modified form operating on a workpiece;
FIG. 6 is a view taken on the line 6—6 of FIG. 5;
FIG. 7 is a view in elevation of another electrochemical machining tool operating on a workpiece;
FIGS. 8a and 8b are views taken on the lines 8a—8a and 8b—8b of FIG. 7;
FIG. 9 is a view in elevation of still another electrochemical machining tool operating on a workpiece;
FIG. 10 is a view taken on the line 10—10 of FIG. 9;
FIG. 11 is a view in elevation of yet another electrochemical machining tool operating on a workpiece;
FIG. 12 is a view taken on the line 12—12 of FIG. 11;
FIG. 13 is a view in elevation of another electrochemical machining tool operating on a workpiece;
FIGS. 14 and 15 are views taken on the lines 14—14 and 15—15 of FIG. 13; and
FIG. 16 is a schematic sketch of an electrochemical machining tool feeding relative to a workpiece.

There is shown in FIG. 1 a machine tool organization for the electrochemical machining of a workpiece 15. The machine tool has a base 16 on which is fixed an upstanding column 17. A table 18 is mounted on the base 16 in front of the column (as viewed in FIG. 1) for reversible movement past the column, in the direction indicated by arrow X. The table has a rigid, electrical insulating, top 19 to which the workpiece 15 is secured. A continuous, upstanding, transparent shield 20 is secured to the periphery of the table to completely surround the workpiece mounted thereon. A ram 21 is slidably received for vertical movement on the upstanding column 17, and a rack 22 on the ram is engaged with a pinion 23 carried by a shaft 24 journaled in the column. Vertical movement, that is, movement in the Y direction, of the ram is effected by rotation of crank 25 secured on shaft 24. The lower portion of the ram is spaced from the column and is in registration with the table to extend inside the table shield 20 when the ram is lowered.

A tool 30 is secured to the lower end face of the ram and is electrically insulated therefrom by the pad of electrical insulating material 31 interposed therebetween. A direct current voltage source 32 has a negative terminal 33 electrically connected by conductor 33a to the tool 30 and a positive terminal 34 electrically connected by conductor 34a to the workpiece 15. Current conducting electrolyte fluid is delivered under pressure from tank 35 to conduit 36 (at least a portion of which is flexible) by pump 37. Line 38, which is connected to line 36 and terminates at the sump, contains relief valve 39 to establish the maximum pressure in line 36. The pressure line defined by conduit 36 is connected to the tool 30, and fluid discharged onto the table top after circulation through the tool 30 is returned to tank 35 through flexible conduit 40.

The tool 30, as shown in FIGS. 2, 3, and 4, has a head portion 45, and a shank portion 46 which terminates in a lower end face 47. The tool head 45, the tool shank 46, and the greater portion 47a of the end face 47 are made of metal for good electrical conduction. A small portion 47b of the end face 47, however, is made of an electrical insulating material. It is only the electrical conducting portion 47a of the end face which defines the machining surface and which is effective in operating on the workpiece. Referring to FIG. 1, relative feed movement between the tool 30 and the workpiece supporting table occurs in the direction indicated by arrow X. This relative feeding movement is effected, in the organization illustrated in FIG. 1, by moving the table 18 (and the workpiece 15 supported thereby) to the right relative to the tool 30, which is held stationary during the machining operation. It will be understood that the same relative feed movement can be attained by movement of the tool to the left relative to a stationary workpiece. In either case, the extreme left boundary of the machining surface 47a (FIG. 4) defines the leading edge 48 of the machining surface (the edge which first comes into registration with any given portion of the workpiece), and the extreme right boundary of the machining surface 47a defines the trailing edge 49 of the machining surface (the edge which last comes into registration with any given portion of the workpiece). In the mechanism shown in FIG. 1, a feed motor 50 rotates, through gear train 51, a feed screw 52 journaled in the base and threadedly engaged with a depending table portion 53 which extends through a slot 54 in the base. The rate of feed movement of the table 18 (which is to the right with the tool of FIG. 1) is controlled by controlling the speed of motor 50 through a speed controller operated by knob 55.

The tool 30 does not rotate and the relative feed movement between the tool 30 and the workpiece 15 is in rectilinear translation parallel to the surface of the workpiece to be machined. The machining surface 47a of the tool 30 is slanted relative to the feed direction (indicated by arrow X), and therefore slanted relative to the straight longitudinal profile (indicated at 60X) of the contour formed on the workpiece in the feed, or longitudinal, direction. In other words, an imaginary line 61 through the machining surface leading and trailing edges 48, 49, and normal thereto, is inclined at a small angle $\alpha$ to the direction of relative feed movement and to the contour profile 60X formed on the workpiece in the feed direction, with the trailing edge 49 spaced toward the workpiece relative to the leading edge 48 for deepest penetration of the workpiece. The profile of the machining surface transverse to the feed direction determines the profile of the workpiece transverse to the feed direction, and, if a contour with a straight profile (indicated at 60Z in FIG. 3) extending in the Z direction is desired on the workpiece, the profile of the machining surface in the Z direction must be straight and parallel to the desired contour profile 60Z. The profile of the tool as it extends in the feed direction (see FIG. 2), since it slopes at a small angle to the feed direction, presents an oblique span $h$ of machining surface to the workpiece substantially greater than the depth $y$ (normal to the feed direction) of workpiece material to be removed. The entire area $hz$ of the machining surface operates continuously on the workpiece after the tool is in full registration with the workpiece, and this area is substantially greater than the area $yz$ (normal to the feed direction) of the material to be removed from the workpiece.

In electrochemical machining, the machining surface of the tool is in closely spaced machining relation to the workpiece surface on which it is operating but without metal-to-metal contact therewith. The machining surface of the tool and the surface of the workpiece define an operating zone 64 therebetween which must be supplied with the electrolyte fluid to transmit the direct current between the workpiece and the tool.

The tool shank 46 has a passage 65 therethrough, almost as wide as the tool (in the Z direction) terminating at an elongated opening 66 in the machining surface which extends along the leading edge 48 thereof and in closely spaced relation thereto. The tool shank 46 has a similar passage 67 therethrough terminating at an elongated opening 68 in the insulated surface 47b adjacent the machining surface and extending along the trailing edge 49 thereof. Both of these passages are in continuous communication with conduit 36 through a cavity 69 in head 45 of the tool, and electrolyte fluid under pressure supplied to these passages is discharged from openings 66 and 68. Thus, from the time the leading edge 48 encounters the workpiece until the trailing edge 49 leaves the workpiece, fluid is delivered to the machining surface. The machining surface 47a of the tool extends into the path of the workpiece 15. The leading edge 48 of the machining surface is in closely spaced relation to the unmachined surface of the workpiece as the workpiece encounters the tool. Even with only the leading edge of the machining surface in registration with the workpiece, machining of the workpiece will begin by virtue of the fluid introduced at the leading edge through opening 66, and entry of the tool into the workpiece is facilitated. The trailing edge 49, which effects the deepest penetration of the workpiece in the Y direction, is supplied with fluid, from opening 68 even with only the trailing edge of the machining surface in registration with the workpiece, and exit of the tool from the workpiece is facilitated.

With the tool 30, some fluid will escape from the operating zone around the periphery of the tool, and some of the fluid will flow into the operating zone from the leading and trailing edges. To facilitate circulation of fluid through the operating zone, a passage 70, between passages 65 and 67, has an opening 71 in the machining surface intermediate openings 66 and 68. Passage 70 does not communicate with cavity 69, but has discharge openings 72 at the sides of shank 46 of the tool. Thus fluid from the operating zone 64 is discharged through opening 71, passage 70, and openings 72 for return to tank 35 through conduit 40. The circulation of fluid through the tool and operating zone is indicated by the short single headed straight arrows in FIGS. 2 and 4.

Relative feeding movement between the tool and the workpiece must be below a rate which would produce metal-to-metal contact between the tool and the workpiece or, stated differently, metal must be removed from the path of the tool at a rate to preclude metal-to-metal contact during relative feeding movement between the tool and the workpiece. During feeding movement, the tool moves a given distance in the X direction in any given increment of time, as tool T in FIG. 16, and in that time a volume of metal V of workpiece W, indicated by cross hatching, is removed from the path of any given incremental area A of the tool face. The volume of metal which must be removed in a given time from the path of a given incremental area (for example, one square inch) of the machining surface will vary with the angle of said incremental area to the feed direction, the steeper the angle the greater the volume of workpiece material which must be removed. Thus the steepest angle of the machining area to the feed direction (indicated by arrow X) determines the maximum permissable feed rate; the smaller this feed determining angle, the greater the permissable feed rate.

Since all incremental areas of the machining surface of equal size are substantially equally effective in removing metal from the workpiece, it is desirable that all, or substantially all, of the machining area be at the same angle to the feed direction. If a minor portion of the machining area is not at this angle (such as the portion of the machining area 47a adjacent leading edge 48), it must be at a smaller angle to the feed direction than the major portion of the surface. If the minor portion of the machining area were at a steeper angle to the feed direction than the major portion of the machining surface, the rate of feed would have to be limited in accordance with the angle of the minor portion of the surface to a rate slower than the major portion of the surface would be capable of feeding by virtue of the shallower angle thereof. In this regard it will be noted that the major portion of the machining surface of tool 30 comprise flat areas at the same angle $\beta$ to the feed direction X, and the minor portion of that surface not at the angle $\beta$ is at a smaller angle, specifically zero degrees. Preferably, the span in the X direction of any openings in the machining surface, which do not form part of the current path, and any other portions of the face of tool, such as area 47b, not carrying current will be at zero degrees to the feed direction since these areas do not contribute to the metal removal.

If a given relative feed rate between the tool and the workpiece is desired, this feed rate dictates the maximum angle permissable between the machining surface of the tool and the feed direction. With these parameters established, the depth of cut is determined by the length of the tool in the X direction.

There is shown in FIGS. 13, 14, and 15 a tool 75 which permits a selection of depth of cut with a given angle of the machining area to the direction of feed, indicated by arrow X in FIG. 13. The tool comprises a head portion 76 which is connected to the ram, and a plurality of detachable sections secured to the head portion by bolts 74. The detachable sections, which are held together by bolts 73, include a leading end section 77, a trailing end section 78, and intermediate sections 79 and 80. The end faces 81, 82, 83, and 84, respectively, of these sections define machining surface sections which together define a machining surface. The head portion 76 has a cavity 86 with wide outlet passages 86a, 86b, 86c, 86d leading therefrom. Each of the intermediate sections 79, and the trailing end section 78, have wide passages 79a in communication with cavity 86 through the outlet passages thereof and terminating in openings 85, which extend along the forward end of the machining surface section. The first, or leading, intermediate section in the tool is a section 79, and the leading and trailing end sections 77 and 78 are short in the feed direction, so that fluid under pressure supplied to cavity 86 flows to the operating zone 87 between the tool and the workpiece 88 at the leading and trailing edges 89, 90, respectively, of the machining surface. All intermediate sections 79 between the leading and trailing sections of the tool supply fluid to the operating zone. The other intermediate sections of the tool 80, which are interposed between the sections 79, have passages 80a terminating at openings 91 which communicate with side openings 92 for discharge of fluid from the operating zone 87.

The machining surface (83, 84) of each intermediate section (79, 80, respectively) comprises a small portion 83a, 84a (aligned with the opening therein and at a zero angle to the feed direction), and a large flat portion 83b, 84b at the angle $\beta$ to the feed direction. All the intermediate sections 79 are identical and all the intermediate sections 80 are identical, each section 79, 80 having an upper surface 93, 94, respectively, parallel to the larger portion of the machining surface. The head portion 76 has a series of stepped end surfaces. 76a, 76b, 76c, 76d, 76e, 76f, 76g, all at the angle $\beta$ to the feed direction, to receive the tool sections. The steps in the end face of the head portion 76 are provided to position the leading edge of each intermediate section, and the leading edge of the trailing end section, flush with the trailing edge of the preceding tool section. With this construction, additional pairs of intermediate sections 79, 80 can be added to the tool to increase the depth of cut on the workpiece while retaining the same angle $\beta$ of the machining surface to the feed direction (thus maintaining the same feed rate). Conversely, a pair of intermediate sections 79, 80 can be removed from the tool to decrease the depth of cut. The outlet passages of cavity 86, as 86d in FIG. 13, not required because no tool section is connected in registration therewith, are plugged.

The tool 100 of FIGS. 5 and 6 is similar to the tool 30 of FIGS. 2, 3, and 4, except that the profile of the tool in the Z direction (transverse to the X, or feed, direction), and the leading and trailing edges 101 and 102 of the machining surface, are shaped to form a V-shaped contour on the workpiece 103 with a profile (in the Z direction) as indicated at 103Z. As in the tool of FIGS. 2, 3, 4, the major portion of the machining surface slopes at a small constant angle $\beta$ to the feed direction to present a surface oblique to the workpiece in the X direction and forms a straight contour with a straight profile 103X (in the X, or feed, direction) on the workpiece.

The tool 110 of FIGS. 7, 8a, and 8b is mounted on ram 21 for vertical feeding movement relative to a workpiece 111 held in a fixed position on table 18 during machining. The workpiece 111 has a pilot hole 112 on axis B extending therethrough, the wall, or surface of which is to be machined. The tool 110 has a head 113, an upper shank portion 114, an intermediate shank portion 115, and a lower shank portion 116. The outer surface 117 of the intermediate shank portion 115 alone defines the machining surface of the tool, and the circular upper edge 118 of the surface 117, having its center on axis B, constitutes the trailing edge of the machining surface which establishes the final size of the hole machined. The circular lower edge 119 of intermediate shank portion 115, which is of smaller diameter than edge 118 for entry into the pilot hole, also has its center in axis B and constitutes the leading edge of the machining surface. An annular groove 120 defines an opening in the machining surface extending completely around the machining surface to divide the machining surface into two truncated conical sections, the upper edge of the lower section having the same diameter as the lower edge of the upper section. Every surface element of the machining surface is at the same angle $\beta$ to the vertical feed direction, which is parallel to axis B and parallel to the surface to be machined.

The intermediate shank portion 115 of the tool is connected in axially spaced relation to the upper shank portion 114 by a plurality of electrical conducting tubes 121 circumferentially spaced about axis B and tightly secured in both upper shank portion 114 and intermediate shank portion 115. These tubes 121 communicate with passages 122 in the upper shank portion 114 and with the annular groove 120. Groove 120, tubes 121, and passages 122 define a discharge passage for fluid circulated through the operating zone 123 between the workpiece and the machining surface.

The lower shank portion 116 of the tool, which is made of electrical insulating material, has a cylindrical portion 116a spaced from the intermediate portion 115 of the tool and of equal diameter to leading edge 119 (that is, of slightly smaller diameter than the pilot hole 112). The shank portion 116 also has a smaller disc portion 116b secured to shank portion 115 and having radial passages 123 extending therethrough. The upper shank portion 114 has a ring 124 of electrical insulating material secured to the lower end thereof and having an outer diameter equal to the diameter of the trailing edge 118 and hence slightly smaller than the finished diameter of the workpiece bore. Fluid is supplied to the operating zone 123 through a passage 125 extending through head 113, upper shank portion 114, intermediate shank portion 115, and terminating in lower shank portion 116. Fluid from passage 125 flows to the leading and trailing edges of the machining surface through the spaces between the shank portions, and flow of fluid forwardly and rearwardly from the leading and trailing edges, respectively from the operating zone is limited by portion 116a of the lower shank portion 116 and the ring 124 on the upper shank portion 114.

As in the previously described tools, the machining surface 115 is inclined at an angle to the feed direction with the trailing edge 118 spaced behind the leading edge 119 with respect to the direction of relative feeding movement and spaced laterally toward the workpiece from the leading edge. As in the previous embodiments, the machining surface operates obliquely on the workpiece for machining over a considerably greater area than the area of the workpiece metal to be removed normal to the relative feed direction. The trailing edge 118, which in this embodiment is circular, determines the final size and shape of the enlarged hole formed in the workpiece. The workpiece is spaced from table 18 by mounting block 126 to permit the entire machining surface, including the trailing edge 118, to pass completely through the workpiece. Fluid leaking past lower shank portion 116 drains out passage 127 in the support block 126.

The tool 130 of FIGS. 9 and 10 is connected to the lower end of ram 21 and held stationary while a workpiece 131, mounted on table 18 by support 132, is fed through the tool by movement of the table to the left as viewed in FIG. 10. The tool has a machining surface 133 surrounding a longitudinal axis D, the machining surface having a circular leading edge 134 and a circular trailing edge 135. The machining surface, as in previous embodiments, is slanted obliquely relative to the feed direction and extends into the path of the workpiece to operate obliquely on the workpiece. The leading edge has a diameter slightly larger than the diameter of the unmachined workpiece for receipt of the workpiece therein. The trailing edge 135, as in previous embodiments, effects the deepest penetration of the workpiece and has a diameter corresponding to the final desired size of the workpiece. Two fluid inlet conduits 136, 137, which are connected to conduit 36, supply electrolyte fluid, respectively, to annular chambers 138, 139 in the tool. Internal passage 140, in communication with chamber 138, terminates in an opening 141 in the machining surface extending along, and just behind, the circular leading edge 134. Internal passage 142, in communication with chamber 139, terminates in an opening 143 in the machining surface extending along, and just ahead of, the circular trailing edge 135. Pressure fluid not leaking past the leading and trailing edges 134 and 135 flows through the operating zone 144 between the machining surface and workpiece and into discharge passage 145 having outlet 146.

In the embodiments previously described, the leading and trailing edges are in parallel planes which are spaced in the direction of relative movement between the workpiece and the tool and which are normal to the direction of relative movement between the workpiece and the tool. The relative movement between the workpiece and the tool is linear, and, more specifically, constitutes rectilinear translation (that is, movement in a straight line without relative rotation).

In the apparatus of FIGS. 7, 8a, and 8b the hole as finished by the tool has a circular cross-section and in the apparatus of FIGS. 9 and 10 the shaft is finished to a conformation circular in cross-section. In both these embodiments, the tool has a longitudinal axis (as B in FIG. 7) and has a machining surface completely surrounding the longitudinal axis (as surface 115) to define a continuous or closed leading edge (as edge 119) and a continuous, or closed, trailing edge (as edge 118). It should be noted, however, that holes of other cross-sectional shape, and shafts or bars of other cross-sectional conformation, can be finished in accordance with the present invention. Any workpiece surface surrounding an axis (as the surface of hole 112 surrounds axis B) can be finished with a tool having a tool body of a cross-sectional conformation complementary to the desired cross-sectional conformation of the workpiece (as the cross-section of tool 110 is complementary to the cross-section of workpiece 111) and corresponding in other respects to the tool 110 or 130.

A machine tool organization, as shown in FIGS. 11 and 12, has a chuck 155 (driven by motor 170) and a tailstock 156 to support a cylindrical workpiece 154 on axis C electrically insulated from the rest of the machine tool. A tool 150 has a machining surface 151 with leading edge 152 and trailing edge 153 which extend axially along the workpiece. The workpiece 154 is rotated by the chuck about longitudinal axis C and in the direction indicated by arrow 157 to feed the surface of the workpiece past the machining surface. Electrolyte fluid under pressure is supplied from a source 171 to tool 150 through inlets 158 and flows into passages 159, 160 terminating at the machining surface at openings 161, 162 which extend, respectively, along the leading and trailing edges of the machining surface between end walls 168 and 169 of the tool. Fluid from the operating zone 163 is discharged through passage 164, cross passage 165, and through outlets in the end walls 168 and 169. The tool is continuously fed into the work, as indicated by arrow 116, by a motor shown schematically at 172 at a rate coordinated with the rate of rotation of the workpiece to maintain the leading edge 152 in closely spaced relation to the surface of the workpiece. A source of electrical energy 173 comprising a direct current voltage source is connected to the workpiece (through brush 174) and the tool to maintain the tool, which is also insulated from the rest of the machine, negative with respect to the workpiece.

What is claimed is:

1. An electrochemical machining tool for removing a cylindrical layer of material from a workpiece comprising a tool body having a machining surface thereon symmetrical about an axis, said machining surface having circular edges of different diameter in spaced parallel planes normal to the axis, said circular edges having centers on said axis, said tool body defining passages for the circulation of electrolyte fluid including passages terminating in openings extending along said edges and a passage terminating in an opening between said edge openings.

2. A machine tool organization for the electrochemical removal of a cylindrical layer of material from a workpiece comprising in combination a tool supporting member and a workpiece supporting member, a tool fixed on the tool supporting member in the path of a workpiece and having an electrical conducting machining surface for operational engagement with a workpiece, said machining surface symmetrical about an axis and extending along said axis, said machining surface circular in cross-section transverse to said axis and having circular edges of different diameter in axially spaced parallel planes normal to said axis, said tool defining supply passages terminating in openings extending along said edges and defining a discharge passage having an opening in the machining surface between said edge openings, a source of electrolyte fluid, means connecting said source of electrolyte fluid to said supply passages, means to effect relative linear movement between said tool supporting member and said workpiece supporting member parallel to said axis, and a source of electrical energy electrically connected to the machining surface and the workpiece to render the machining surface electrically negative with respect to the workpiece.

3. A machine tool organization for the electrochemical finishing of a cylindrical workpiece comprising in combination a tool supporting member and a workpiece supporting member, means to effect relative linear movement between said tool supporting member and said workpiece supporting member, a tool on the tool supporting member having an electrical conducting machining surface for operational engagement with the workpiece, said machining surface symmetrical about an axis parallel to said direction of linear movement and extending along said axis, said machining surface circular in cross-section transverse to said axis and having a circular leading edge and a circular trailing edge in axially spaced parallel planes normal to said axis, said circular leading edge of a diameter to receive said workpiece and said circular trailing edge of a smaller diameter corresponding to the desired finished diameter of the workpiece, said tool defining supply passages terminating in openings extending along the leading and trailing edges and defining a discharge passage in the machining surface between the leading and trailing edges, a source of electrolyte fluid, means connecting said source of electrolyte fluid to said supply passages, and a source of electrical energy electrically connected to the machining surface and the workpiece to render the machining surface electrically negative with respect to the workpiece.

4. A machine tool organization for the electrochemical finishing of a hole in a workpiece along an axis to a predetermined cross-sectional conformation comprising in combination a tool supporting member and a workpiece supporting member, means to effect relative linear movement between the tool supporting member and the workpiece supporting member for feeding parallel to said workpiece axis, a tool on the tool supporting member having a longitudinal axis for alignment with the workpiece axis, said tool having a machining surface surrounding said longitudinal axis and extending along said longitudinal axis, said machining surface having a continuous leading edge to fit within the hole and having a continuous trailing edge corresponding in cross-section to said predetermined cross-sectional conformation, said machining surface inclined with respect to said longitudinal axis with the trailing edge thereof effecting the deepest penetration of the workpiece, said tool defining passages for the circulation of electrolyte fluid including passages terminating in openings extending along said edges and a passage terminating in an opening between said edge openings.

5. A machine tool organization for the electrochemical finishing of a bar to a predetermined cross-sectional conformation comprising in combination a tool supporting member and a workpiece supporting member, means to effect relative linear movement between the tool supporting member and the workpiece supporting member for feeding parallel to said bar, a tool on the tool supporting member having a longitudinal axis for alignment with the bar, said tool having a machining surface surrounding said longitudinal axis and extending along said longitudinal axis, said machining surface having a continuous leading edge to receive the bar and having a continuous trailing edge corresponding in cross-section to said predetermined cross-sectional conformation, said machining surface inclined with respect to said longitudinal axis with the trailing edge thereof effecting the deepest penetration of the workpiece, said tool defining passages for the circulation of electrolyte fluid including passages terminating in openings extending along said edges and a passage terminating in an opening between said edge openings.

6. A machine tool organization for the electrochemical finishing of a bar to a predetermined cross-sectional conformation comprising in combination a tool supporting member and a workpiece supporting member, means to effect relative linear movement between the tool supporting member and the workpiece supporting member for feeding parallel to said bar, a tool on the tool supporting member having a longitudinal axis for alignment with the bar, said tool having a machining surface surrounding said longitudinal axis and extending along said longitudinal axis, said machining surface having a continuous leading edge to receive the bar and having a continuous trailing edge corresponding in cross-section to the predetermined cross-sectional conformation, said tool defining passages for the circulation of electrolyte fluid including passages terminating in openings extending along said edges and a passage terminating in an opening between said edge openings.

References Cited

UNITED STATES PATENTS

| | | | |
|---|---|---|---|
| 2,187,744 | 1/1940 | Kraus | 90—18 |
| 2,385,198 | 9/1945 | Engle | 204—224 X |
| 2,526,423 | 10/1950 | Rudorff. | |
| 2,848,410 | 8/1958 | Knuth-Winterfeldt et al. | 204—224 |
| 3,002,907 | 10/1961 | Williams | 204—224 X |
| 3,043,766 | 7/1962 | Williams | 204—224 X |
| 3,058,895 | 10/1962 | Williams | 204—224 |

JOHN H. MACK, *Primary Examiner.*

A. B. CURTIS, W. VANSISE, *Assistant Examiners.*